United States Patent
Su et al.

(10) Patent No.: US 7,643,232 B2
(45) Date of Patent: Jan. 5, 2010

(54) PIEZOELECTRIC-DRIVING OPTICAL LENS

(75) Inventors: Han-Wei Su, Tainan (TW);
Chao-Chang Hu, Kaohsiung (TW);
Sheng-Chih Shen, Tainan County (TW);
Jwo-Ming Jou, Kaohsiung (TW);
Kai-Lin Huang, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 561 days.

(21) Appl. No.: 11/556,330

(22) Filed: Nov. 3, 2006

(65) Prior Publication Data

US 2008/0074767 A1  Mar. 27, 2008

(30) Foreign Application Priority Data

Sep. 26, 2006  (TW) ............................... 95135549 A (51) Int. Cl.
*G02B 7/02* (2006.01)
(52) U.S. Cl. .................... 359/824; 359/822; 359/814
(58) Field of Classification Search ................ 359/824
See application file for complete search history.

(56) References Cited

U.S. PATENT DOCUMENTS

| | | | | |
|---|---|---|---|---|
| 4,303,324 A | * | 12/1981 | Marcus | .................. 396/133 |
| 4,601,539 A | * | 7/1986 | Watanabe | .................. 359/824 |
| 4,755,705 A | | 7/1988 | Holum | |
| 4,786,836 A | | 11/1988 | Tokushima | |
| 4,829,209 A | | 5/1989 | Kawasaki et al. | |
| 4,935,659 A | | 6/1990 | Naka et al. | |
| 4,952,834 A | | 8/1990 | Okada | |
| 4,959,580 A | | 9/1990 | Vishnevsky et al. | |
| 5,013,982 A | | 5/1991 | Sasaki | |
| 6,710,950 B2 | | 3/2004 | Rouvinen et al. | |
| 6,853,507 B2 | | 2/2005 | Ryu et al. | |
| 7,522,351 B2 | * | 4/2009 | Lee et al. | .................. 359/694 |
| 7,525,739 B2 | * | 4/2009 | Lin | .................. 359/696 |
| 7,556,443 B2 | * | 7/2009 | Kleverman | .................. 396/529 |
| 2005/0140959 A1 | * | 6/2005 | Tsuji et al. | .................. 355/72 |
| 2005/0258714 A1 | | 11/2005 | Henderson et al. | |
| 2006/0028743 A1 | * | 2/2006 | Yamashita et al. | .......... 359/824 |

FOREIGN PATENT DOCUMENTS

| | | |
|---|---|---|
| CN | 2659021 | 11/2004 |
| JP | 200617923 | 1/2006 |
| JP | 200698587 | 4/2006 |
| KR | 20040078265 | 9/2004 |
| KR | 1020040078265 | 9/2004 |

* cited by examiner

*Primary Examiner*—Jessica T Stultz
(74) *Attorney, Agent, or Firm*—WPAT, PC; Justin King (57) ABSTRACT

A piezoelectric-driving optical lens is disclosed, which comprises: a lens, having a barrel with a friction ring annularly mounted on the outer wall of the barrel as the outer diameter of the friction ring is larger than that of the barrel; a plurality of piezoelectric stators, arranged surrounding the lens and abutted against the friction ring, for providing a rotation driving force to the lens for focusing or zooming function; and a seat, for receiving the lens and the plural piezoelectric stators; wherein, the plural piezoelectric stators can actuate simultaneously to output a maximum driving torque.

12 Claims, 6 Drawing Sheets

PIEZOELECTRIC-DRIVING OPTICAL LENS

FIELD OF THE INVENTION

The present invention relates to piezoelectric-driving optical lens, and more particularly, to an optical lens capable of being driven to rotate by piezoelectric stators for focusing or zooming. It is suitable for various lens-related applications, such as video conference systems, monitor systems, conventional cameras, digital cameras and camera phones, as it is compact, solid, simple-in-structure, ease-to-manufacture, ease-to-assemble, and capable of exerting a comparatively larger torque.

BACKGROUND OF THE INVENTION

Nowadays, ultrasonic motors, also known as piezoelectric motors, and other piezoelectric actuators are commonly used in conventional cameras, digital cameras and camera phones, that are functioned as the drives of optical lenses for focusing the same and are becoming one of the most important elements for optical products. One such example is the Helimorph® piezoelectric actuator of 1 Ltd., England. It is a coil-like bimorph piezoelectric ceramic actuator. The actuators have some properties of compact, low power consumption, silent operation and high displacement to act as the mechanism for focussing. However, while manufacturing the coil-like Helimorph® piezoelectric actuator from a raw bimorph piezoelectric ceramic, a great amount of procedures are required to be accomplished manually, that are not preferred to be done by automatic machinery since the referring manufacturing procedures are difficult and highly delicate that manual operation can reduce the risk of low yield and instable quality. As the manufacturing of the coil-like bimorph piezoelectric ceramic actuator requires many man powers, it is difficult to apply the aforesaid coil-like piezoelectric actuator massively in industries relating to conventional cameras, digital cameras and camera phones.

Moreover, it is highly common and had already a prior art for a conventional camera to adopt piezoelectric motors or other piezoelectric actuators in its configuration. Such applications can be seen in U.S. Pat. No. 4,755,705, U.S. Pat. No. 4,786,836, U.S. Pat. No. 4,829,209, U.S. Pat. No. 4,935,659, U.S. Pat. No. 4,952,834, U.S. Pat. No. 4,959,580, U.S. Pat. No. 5,013,982, and so on. As the sizes of those conventional film-using cameras are usually large enough, they will have no problem accommodating the prior-art piezoelectric motors within their configurations. Nevertheless, as digital cameras are gradually replacing the conventional film-using cameras and cellular phones with auto-focus camera are becoming more and more popular, the aforesaid prior-art piezoelectric motors are becoming too bulky and no longer suitable to fit in those two products since the sizes of the two are usually smaller that that of a conventional camera. Hence, it is noted that the size of the prior-art optical lens module is the major restriction preventing the miniaturization of digital camera and camera phone.

There are already a few patents, dissertations and researches relating to the development of compact piezoelectric-driving optical lens for digital cameras and camera phones. However, the structures of all those compact piezoelectric-driving optical lens are too complicated to be manufactured in batch processes.

Figure 1:
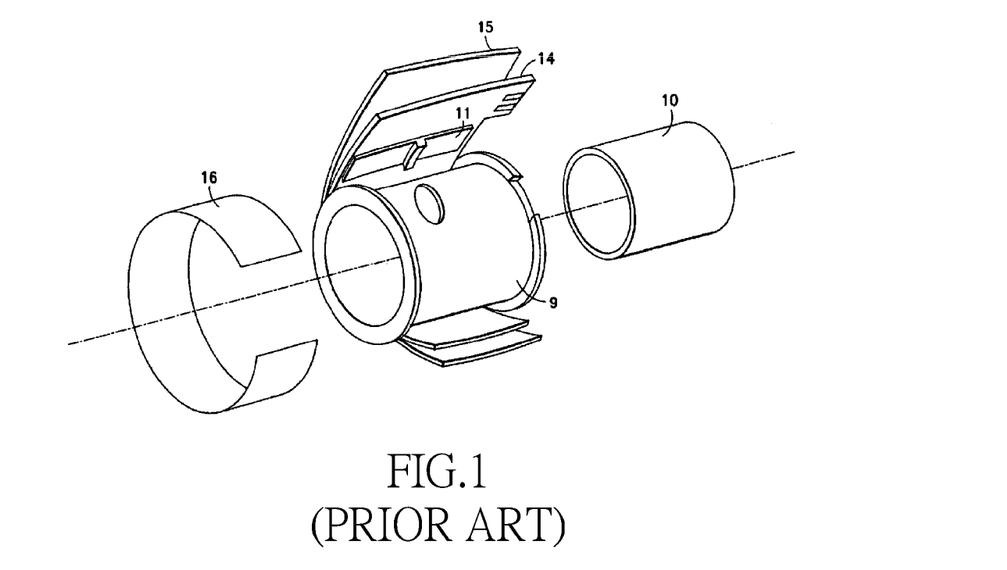
FIG. 1 is an exploded perspective view of an piezoelectric lens assembly, disclosed in U.S. Pat. No. 6,710,950.

Please refer to FIG. 1, which is an exploded perspective view of an piezoelectric lens assembly, disclosed in U.S. Pat. No. 6,710,950, entitled "Piezoelectric actuator for digital camera optical system". The lens assembly, as shown in FIG. 1, consists of a support tube 9 and a lens tube 10. Lens tube 10 holds the lens and is mounted coaxially within support tube 9 while being supported within the support tube 9 for movement in an axial direction. The circuit board for the piezoelectric drive is a flexible printed circuit board 14 arranged about the outer cylindrical surface 15 of the support tube 9. A plurality of piezoelectric elements, as the piezoelectric element 11 illustrated in FIG. 1, and their associated components are connected and supported directly by the flexible circuit board 14. The assembly of flexible circuit board and a resilient insulating sheet 15 is held in place on support tube 9 by a split ring shaped spring 16. Support and motion for the lens tube 10 is provided by the plural piezoelectric elements. However, the autofocus capability of the lens assembly is entirely dependent on the displacement of the lens tube 10, and consequently, it is bulky and difficult to provide an accurate circuit control.

Figure 2:
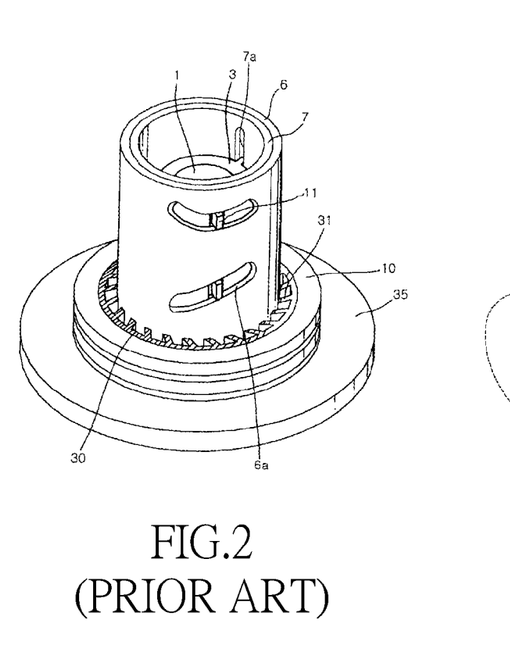
FIG. 2 is a perspective view of a lens driving device, disclosed in U.S. Pat. No. 6,853,507.

Please refer to FIG. 2, which is a perspective view of a lens driving device, disclosed in U.S. Pat. No. 6,853,507, entitled "Lens driving device". The cylindrical stationary barrel 7 is mounted on the base 35 while the cylindrical rotary barrel 6, also mounted on the base 35, is disposed surrounding the stationary barrel 7. The focus lens 1, fitted in a lens frame 3, is movably mounted within the stationary barrel 7 in a manner that the bosses 11 thereof are projected outward. The barrels 6 and 7 are provided with the linear guide slots 6a and 7a for receiving the bosses 11 so that the lens 1 may be shift forward and backward along the guide slots 6a and 7a. Moreover, the driving member 30, also mounted on the base 35 while enabling its teeth-like segments 31 to be arranged substantially adjoining the barrel 6 so that the segments are in contact with the barrel 6. The piezoelectric actuator 10, being arranged in the form of a ring around the rotary barrel 6, is contracted or expanded radially in response to an input signal from the outside. As the piezoelectric actuator 10 repeats radial contraction toward the barrel and radial restoration from the same, the drive member 30 is driven to repeat contraction and restoration in response to radial contraction of the piezoelectric actuator 10, pushing the inclined segments 31 outward, so that the segments 31 rotate the rotary barrel 6 along the inclination of the segments 31 and thus drive the lens 1 to move axially inside the stationary barrel 7. However, the cost of the lens driving device is expensive since the structure of aforesaid lens driving device is still very complicated, not to mention the difficulty of manufacturing the driving member 30, and the piezoelectric actuator 10 must be polarized in segment.

Figure 3:
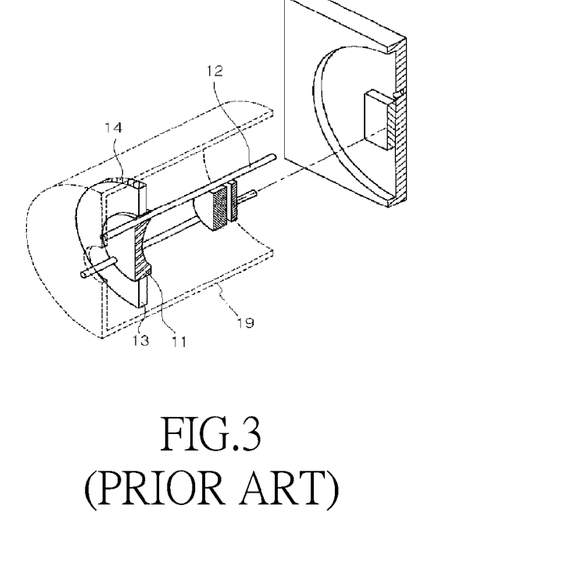
FIG. 3 shows a lens driving apparatus, disclosed in Korea Pat. Appl. No. 1020040078265.

Please refer to FIG. 3, which shows a lens driving apparatus, disclosed in Korea Pat. Appl. No. 1020040078265, entitled "Transfer unit, in which a lens and an actuator are formed in one body". The lens driving device is substantially a cylinder 19 having a guide rod 12, a piezoelectric member 13 and a supporting block 14 arranged therein. However, as certain mass is required in the aforesaid lens driving device for causing inertial force, not only the weight of the lens driving device is increased, but also the diameter of the cylinder is increased.

As the structures of all those aforesaid prior-art piezoelectric optical lenses are very complicate, not only they are difficult to manufacture, but also they are not easy to be assembled that is especially true for the assembling of the piezoelectric stators. Hence, the driving force provided thereby is diminished. Moreover, as some minute parts thereof can not be fabricated by machine, the consumption of man-power and cost are increased. Thus, although the sizes of aforesaid prior-art piezoelectric-driving optical lenses are reduced, they have no competitive advantage over cost reduction and thus are not feasible for commercial marketing.

Therefore, it is in need of a piezoelectric-driving optical lens, which is compact, solid, simple-in-structure, ease-to-manufacture, ease-to-assemble, and capable of exerting a comparatively larger torque.

SUMMARY OF THE INVENTION

In view of the disadvantages of prior art, the primary object of the present invention is to provide a piezoelectric-driving optical lens, which is compact, solid, simple-in-structure, ease-to-manufacture, ease-to-assemble, and capable of exerting a comparatively larger torque.

To achieve the above object, the present invention provides a piezoelectric-driving optical lens, comprising:
- a lens, having a cylindrical barrel with a friction ring annularly mounted on the outer wall of the barrel as the outer diameter of the friction ring is larger than that of the barrel;
- a plurality of piezoelectric stators, arranged surrounding the lens and abutted against the friction ring, for providing a rotation driving force to the lens; and
- a seat, for receiving the lens and the plural piezoelectric stators;
- wherein, the plural piezoelectric stators can be driven simultaneously to output a maximum driving torque for focusing the lens.

In a preferred aspect, the lens further comprises:
- an inner screw thread, formed on the inner wall of the cylindrical barrel;
- at least a frame, each for holding a set of optical lenses while each being screwed into the barrel;
- a lid, disposed at an axial end of the barrel for preventing the frame from moving out of the barrel; and
- a guide base, disposed at another axial end of the cylindrical barrel opposite to that of the lid, having a plurality of guide rods, each being arranged on a barrel-facing surface of the base while extending inside the barrel;
- wherein, the axial direction of each guide rod is parallel to those of the cylindrical barrel, each frame, the lid while enabling each guide rod to drill through and connect to each frame and the lid.

Preferably, the lens can have two or more than two frames while each frame can receive and hold one optical lens set.

Preferably, the guide base is mounted on a back cover while the back cover is connected to the seat.

Preferably, the guide base has three guide rods mounted thereon.

Preferably, each piezoelectric stator is configured of a metal tube and at least a piezoelectric ceramic piece, each being arranged to adhere to a side of the metal tube, wherein, the metal tube is arranged to abut against the friction ring.

In a preferred embodiment, the piezoelectric stator has two piezoelectric ceramic pieces and the two piezoelectric ceramic pieces are adhered respectively on the metal tube while being arranged adjacent to each other for forming a near-90 degree included angle therebetween.

Preferably, electrodes are coated on each piezoelectric ceramic piece according to a predetermined pattern.

Preferably, each piezoelectric ceramic piece is polarized in segments.

Preferably, each piezoelectric ceramic piece is divided into sections and polarized respectively while each section is adhered upon its corresponding side of the metal tube in respective.

In a preferred embodiment, the piezoelectric-driving optical lens has three piezoelectric stators while the three piezoelectric stators can be driven independently or simultaneously.

Preferably, the piezoelectric-driving optical lens has two piezoelectric stator while the two piezoelectric stators can be driven independently or simultaneously with respect to an idler wheel.

Preferably, the piezoelectric-driving optical lens has one piezoelectric stator while the piezoelectric stator is driven with respect to two idler wheels.

Preferably, the plural piezoelectric stators are equiangularly spaced and surrounding the periphery of the lens.

Preferably, the driving mode of each piezoelectric stator is a mode selected from the group consisting of a single-frequency single-phase driving mode, a single-frequency dual-phase driving mode, a dual-frequency single-phase driving mode and a dual-frequency dual-phase driving mode.

In a preferred embodiment, the seat further comprises:
- at least a holding part, further comprising:
  - a first hole, boring through the holding part for enabling the lens to pass therethrough;
  - a gap, being substantially a cut from a side of the first hole to the periphery of the holding part; and
  - a plurality of second holes, disposed surrounding the first hole for enabling the plural piezoelectric stators to pass therethrough in respective;
- a packing part, further comprising:
  - a hole, boring through the packing part for enabling the lens and the plural piezoelectric stators to pass therethrough; and
  - a gap, formed on the packing part at a position corresponding to the gap of the holding part;
- an adjusting part, for adjusting the clearance of the gap;
- wherein, two via holes are bored respectively from the two cutting surfaces of the gap to the periphery of the packing part while keeping the two holes on a same axle and maintaining the axle shared by the two hole to be perpendicular to the axle of the lens.

Preferably, the adjusting part further comprises:
- a resilience element, being disposed inside the gap of the packing part;
- a bolt, capable of being inserted into the two via holes of the packing part from one of the two openings of the two holes located at the periphery of the packing part while penetrating the resilience element; and
- a nut, being positioned at another opening of the two holes located at the periphery of the packing part for the bolt to screw fixedly thereupon;
- wherein, the clearance of the gap of the packing part can be adjusted by relative rotating the bolt and the nut relatively.

Preferably, the resilience element is a substance selected from the group consisting of a spring, a reed, an elastic foam rubber, a sponge and the combinations thereof.

Preferably, the seat has two holding parts, being disposed respectively at positions corresponding to the front and back of the hole of the packing part.

Preferably, the seat can be formed as a shape selected from the group consisting of a triangle, a square, a circle and other geometrical shape and the combinations thereof.

Other aspects and advantages of the present invention will become apparent from the following detailed description,

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 4:
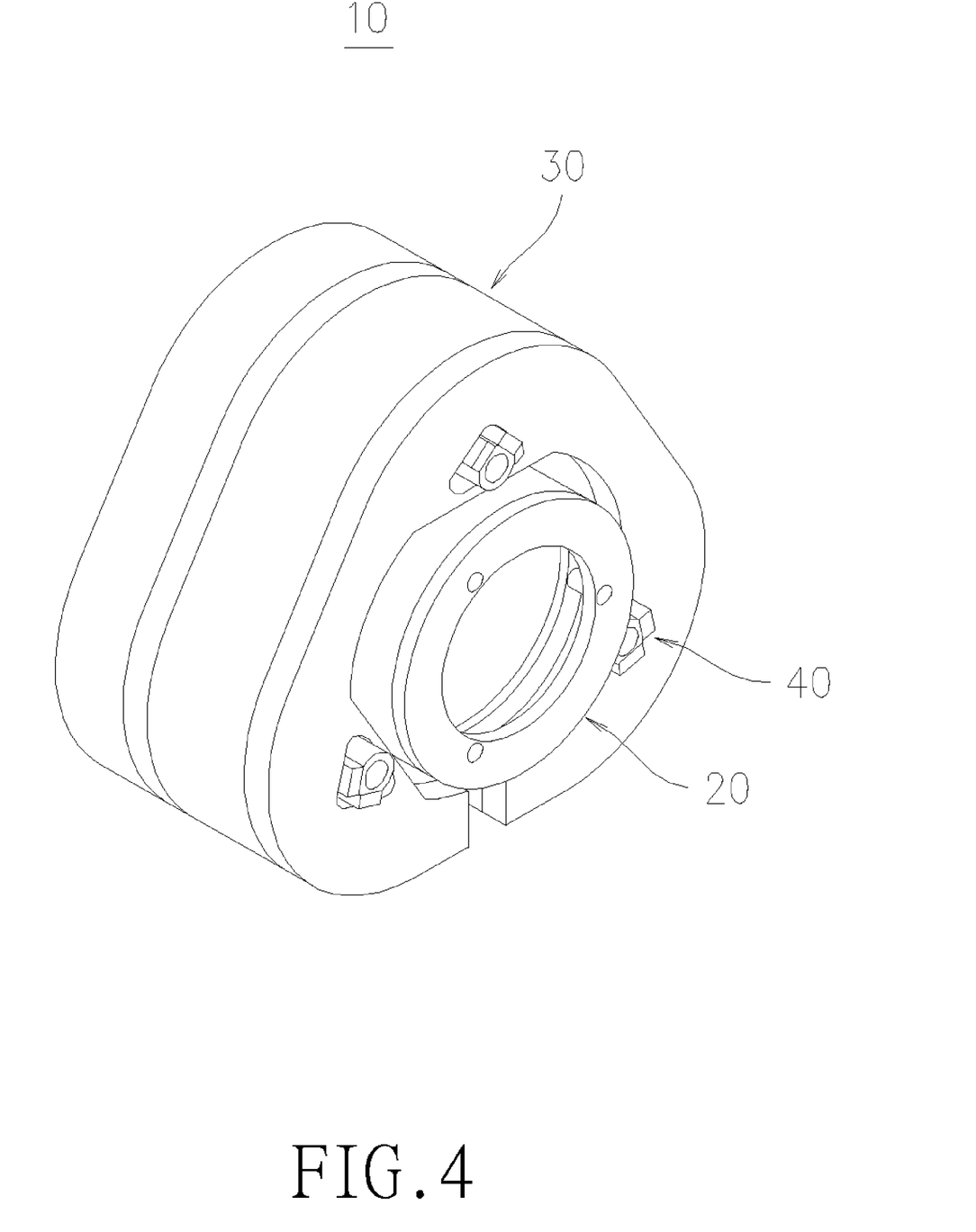
FIG. 4 shows a piezoelectric-driving optical lens according to a preferred embodiment of the invention
Figure 5:
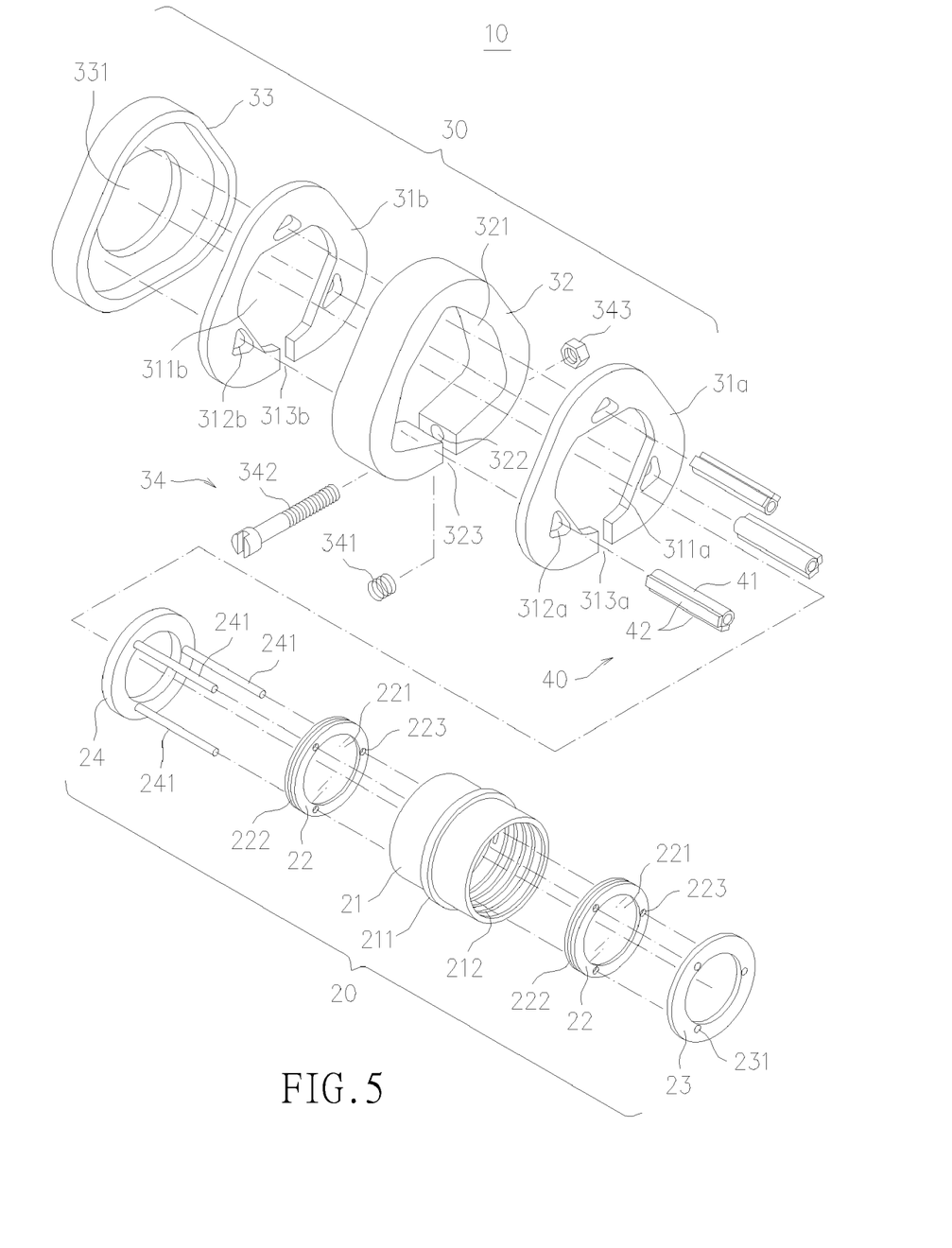
FIG. 5 is an exploded view of FIG. 4.

Please refer to FIG. 4 and FIG. 5, which show respectively a piezoelectric-driving optical lens according to a preferred embodiment of the invention and its exploded view. As seen in the figures, the piezoelectric-driving optical lens 10 is comprised of a lens 20, a plurality of piezoelectric stators 30 and a seat 30, in which the seat 30 is used for receiving the lens 20 and the plural piezoelectric stators 40.

The lens 20 is further composed of a cylindrical barrel 21 having an inner screw thread 212 formed on the inner wall thereof, a frame 22, a lid 23 and a guide base 24, in which the cylindrical barrel with a friction ring 211 is annularly mounted on the outer wall of the barrel as the outer diameter of the friction ring 211. It is noted that the function of the friction ring 211 is to provide additional friction to assist the plural piezoelectric stators 30 for rotating the cylindrical barrel 21. The frame 22, being formed as a ring with outer screw thread 222, is used for holding a set of optical lenses 221 while screwing the frame 22 upon the inner screw thread 21 of the cylindrical barrel 21 by the outer screw thread 222 thereof so as to fix the frame 22 inside the cylindrical barrel 21. By the relative rotations of the cylindrical barrel 21 and the frame 22, the frame 22 is enabled to perform a focusing or zooming operation. In a preferred aspect, there can be two or more than two frames 22 in a lens 20 while each frame 22 can receive and hold one optical lens set 221. Moreover, the lid 23 can be shaped like a disc and disposed at one axial end of the cylindrical barrel 21 for preventing the frames 22 inside the cylindrical barrel 21 from moving out of the same. The guide base 24 is disposed at another axial end of the cylindrical barrel 21 opposite to that of the lid 23, which have a plurality of guide rods 241 connected thereto while enabling each to be arranged on a barrel-facing surface of the guide base 24 and extending inside the cylindrical barrel 21. Preferably, the axial direction of each guide rod 241 is parallel to those of the cylindrical barrel 21, each frame 22, the lid 23 while enabling each guide rod 241 to drill through and connect to each frame 22 and the lid 23. As seen in FIG. 4 and FIG. 5, there are holes 223, 231 formed respectively on the frame 22 and the lid 23 at positions corresponding to the guide rods 241 in respective, that can be passed through by the guide rods 241 and thus hold and secure the guide rods 241. Moreover, the guide base 24 is mounted on a back cover 33 while the back cover 33 is connected to the seat 30.

Figure 6:
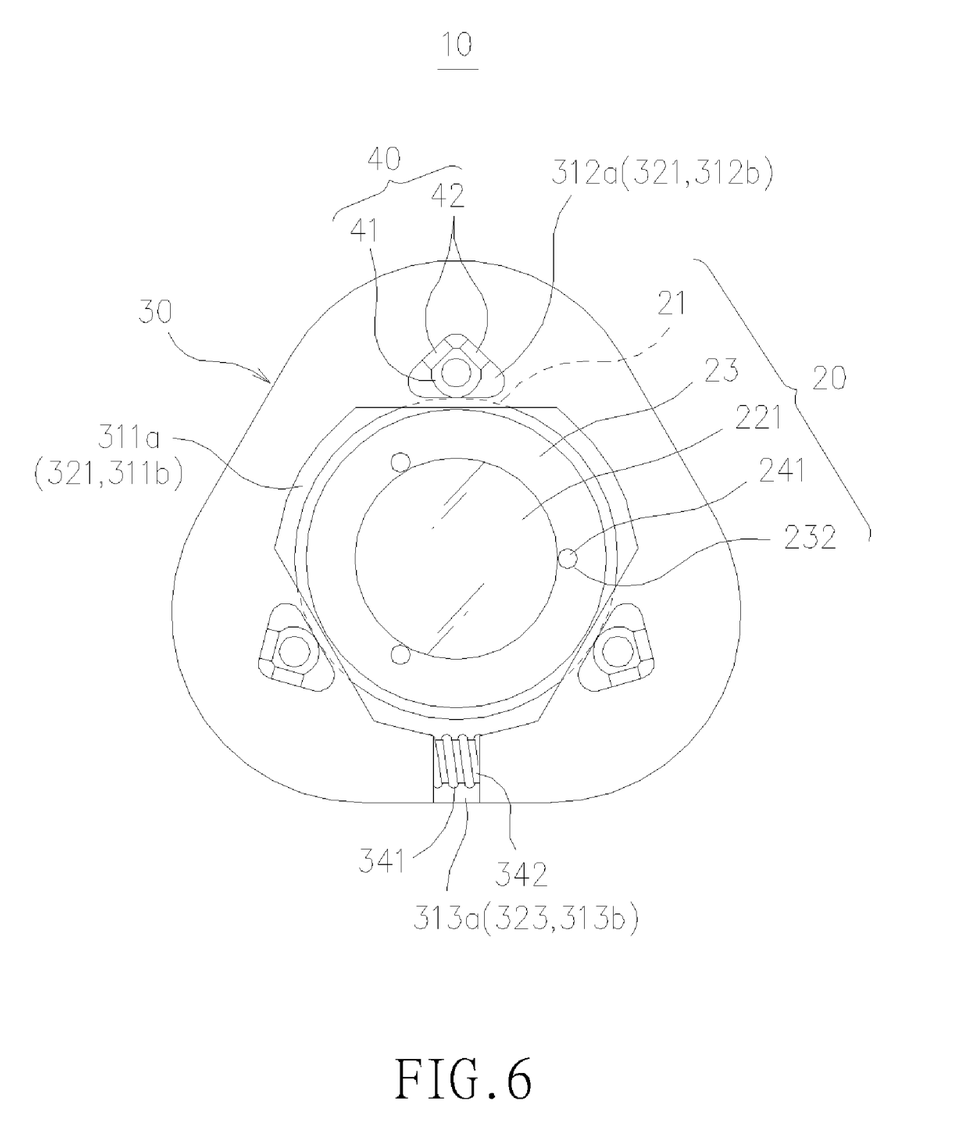
FIG. 6 is a front view of FIG. 4.
Figure 7:
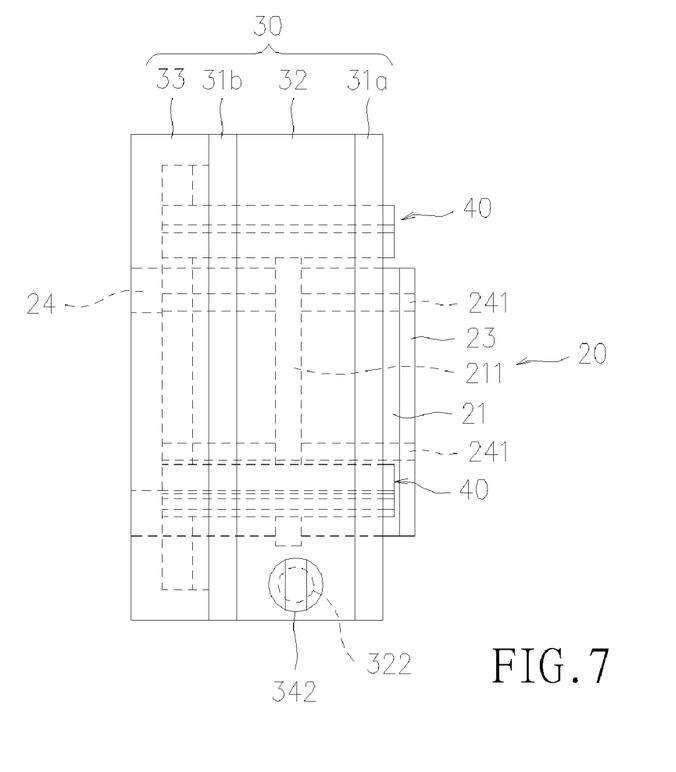
FIG. 7 is a left side view of FIG. 4.
Figure 8:
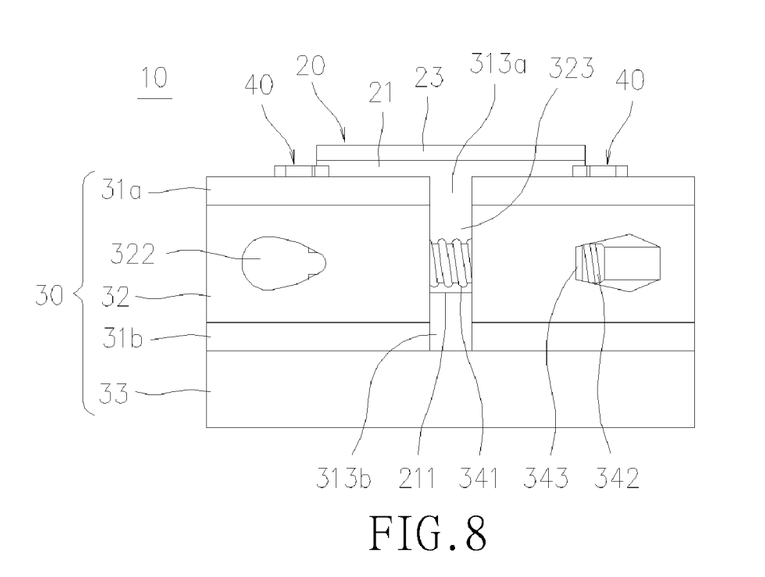
FIG. 8 is a bottom view of FIG. 4.

Please refer to FIG. 5 to FIG. 7, which show an exploded view, a front view and a left side view of FIG. 4. The seat 30 is primarily composed of two holding parts 31a, 31b, a packing part 32, a back cover 33 and an adjusting part 34. As the structures of the two holding parts 31a, 31b, the holding part 31a is selected and used as illustration. As seen in the figures, the holding part 31a is comprised of: a first hole 311a, boring through the holding part 31a for enabling the lens 20 to pass therethrough; a gap 313a, being substantially a cut from a side of the first hole 311a to the periphery of the holding part 31a; and a plurality of second holes 312a, disposed surrounding the first hole 311a for enabling the plural piezoelectric stators 40 to pass therethrough in respective. The packing part 32, being sandwiched between the two holding parts 31a, 31b, is comprised of: a hole 321, boring through the packing part 32 for enabling the lens 20 and the plural piezoelectric stators 40 to pass therethrough; and a gap 323, formed on the packing part 32 at a position corresponding to the gaps 313a, 313b of the two holding parts 31a, 31b; wherein, two via holes 322 are bored respectively from the two cutting surfaces of the gap 323 to the periphery of the packing part 32 while keeping the two via holes 322 on a same axle and maintaining the axle shared by the two via holes to be perpendicular to the axle of the lens 20. In addition, the adjusting part 34, being inserted and passing through the two via holes 322 for adjusting the clearance of the gap 323, is comprised of a resilience element 341, a bolt 342 and a nut 343. The resilience element 341, being disposed inside the gap 323 of the packing part 32, can be a substance selected from the group consisting of a spring, a reed, an elastic foam rubber, a sponge and the combinations thereof; the bolt 342 is capable of being inserted into the two via holes 322 of the packing part 32 from one of the two openings of the two holes 32 located at the periphery of the packing part 32 while penetrating the resilience element 341; and the nut 343 is positioned at another opening of the two via holes 322 located at the periphery of the packing part 32 for the bolt 342 to screw fixedly thereupon. Thereby, the clearance of the gap 323 of the packing part 32 can be adjusted by relatively rotating the bolt 342 and the nut 343.

It is noted that the holding part 31a, the packing part 32, the holding part 31b, and the back cover 33 can be sequentially assembled by means of gluing, clipping or screwing, and so on, and the resulting assembly is shaped as that shown in FIG. 4 which is a triangle. However, it can be a square, a circle and other geometrical shape and the combinations thereof, that are dependent on actual needs. As the lens 20 is arranged passing the first hole 311a, the hole 321 and the first hole 311b and as the guide base 24 of the lens 20 is mounted and fixed upon the back cover 33 while the plural piezoelectric stators 40 are arranged passing the second hole 312a, the hole 321 and the second hole 312b, the gaps 313, 323 of the holding part 31 and the packing part 32 can be adjusted by screwing the bolt 342 since the holding part 31 and the packing part 32 are fixedly interconnected, thereby, the friction ring 211 of the lens 20 can be maintained to keep in contact with the three piezoelectric stators 40 at a preferred state.

Figure 9A:
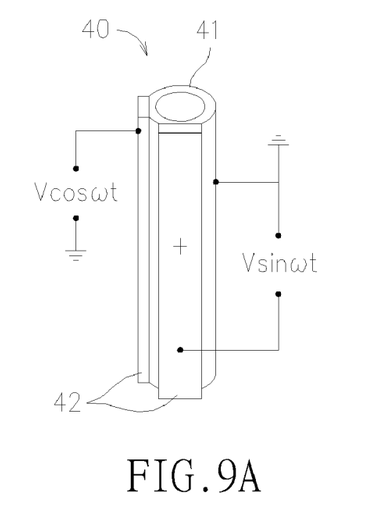
FIG. 9A~FIG. 9D shows a variety of piezoelectric stators of the invention.

As seen in FIG. 5 and FIG. 9A, there are three piezoelectric stators 40 that can be driven independently or simultaneously. Each of the three piezoelectric stators 40 is configured of a metal tube 41 and two piezoelectric ceramic pieces 42, in which the metal tube 41 is arranged to abut against the friction ring 211, and the two piezoelectric ceramic pieces 42 are arranged to adhere to a side of the metal tube 41 in a manner that the two piezoelectric ceramic pieces 42 are adhered respectively on the metal tube 41 while being arranged adjacent to each other for forming a near-90 degree included angle therebetween. It is noted that there can be only one piezoelectric ceramic piece 42 configured in each piezoelectric stator 40 whereas the only piezoelectric ceramic piece 42 is attached to a side of the metal tube 41. In this preferred embodiment, the three piezoelectric stators 40 are equiangularly spaced and surrounding the periphery of the lens 20 while being disposed in the seat 30, in which the metal tube 41 of each piezoelectric stator 40 is abutted against the friction ring 211 of the lens 20 for exerting rotation force upon the cylindrical barrel 21 of the lens 20. For enabling each metal tube to abut against the lens 20 exactly while preventing the plural piezoelectric stators 40 to rotate, the second holes 312a, 312b are shaped as a triangle in corresponding to the triangle shapes of the piezoelectric stators 40 while enabling the points of the triangle-shaped hole 321 to be placed corresponding to the piezoelectric stators 40. It is noted that the shapes of the second holes 312a, 312b and the hole 321 are varied with respect to that of the piezoelectric stators 40.

Figure 9B:
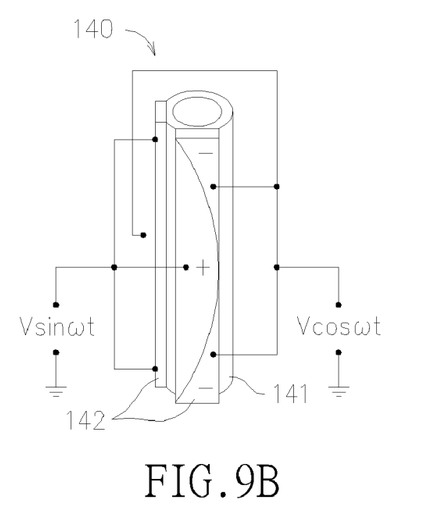
Figure 9C:
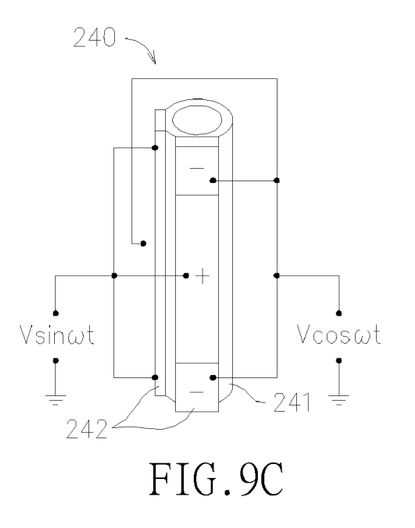
Figure 9D:
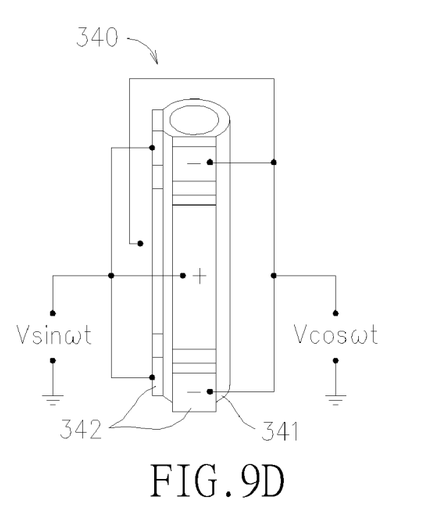

Please refer to FIG. 9A to FIG. 9D, which shows a variety of piezoelectric stators of the invention. The driving mode of each piezoelectric stator 40 is a mode selected from the group consisting of a single-frequency single-phase driving mode (i.e. V sin ωt or V cos ωt), a single-frequency dual-phase driving mode (i.e. V sin ωt and V cos ωt), a dual-frequency single-phase driving mode (i.e. V sin ωt & V sin $\omega_2$t or V cos $\omega_1$t & V cos $\omega_2$t, wherein $\omega_1 \ne \omega_2$) and a dual-frequency dual-phase driving mode (i.e. V sin $\omega_1$t and V cos $\omega_2$t, wherein $\omega_1 \ne \omega_2$). In FIG. 9A to FIG. 9C, the piezoelectric stators 40, 140, 240 are substantially composed of a metal tube, i.e. the tubes 41, 141, 241 in respective, with two piezoelectric ceramic pieces attached thereon, which are the two piezoelectric ceramic pieces 42, 142, 242 in respective. The differences between the embodiment shown in FIG. 9A to FIG. 9C are that: in FIG. 9A, the two piezoelectric ceramic pieces 42 are polarized in respective and independently; in FIG. 9B, electrodes are coated on each piezoelectric ceramic piece 142 according to a predetermined pattern; and in FIG. 9C, each piezoelectric ceramic piece 242 is polarized in segments As for that shown in FIG. 9D, each piezoelectric ceramic piece 342 is divided in to sections and polarized respectively while each section is adhered upon its corresponding side of the metal tube 341 in respective. It is noted that the aforesaid V sin, V cos, etc., are known to those skilled in the art and used only as illustration, that the driving modes are not limited thereby and thus can be a square wave, a triangle wave, and so on.

Operationally, as referring to FIG. 4 and FIG. 5, a driving voltage and frequency of one of the aforesaid driving mode is provided to the plural piezoelectric stators 40 for driving the same simultaneously to provide a maximum output force upon the friction ring 211, and thus, the friction caused by the maximum output force upon the friction ring 211 will bring the cylindrical barrel 21 of the lens 20 to rotate. As the lens 20 is rotating, the frames 22 inside the cylindrical barrel 21 is enabled to zoom in or out by the guide base 24 while the lid 23 prevents the frames 22 from moving out of the cylindrical barrel 21. At the same time that, the optimal boundary conditions and the assembling of the lens 20 and the piezoelectric stators 40 are all being defined by the seat 30 as the lens 20 and the piezoelectric stators 40 are all fixedly secured in the seat 30, such that enables the piezoelectric stators 40 to provide the maximum output force for zooming the lens 20. Instead of the three piezoelectric stators 40 used in the embodiment shown in FIG. 4 and FIG. 5, the piezoelectric-driving optical lens 20 can have two piezoelectric stators 40 while the two piezoelectric stators 40 can be driven independently or simultaneously with respect to an idler wheel, or the piezoelectric-driving optical lens 20 can have one piezoelectric stator 40 while the piezoelectric stator 40 is driven with respect to two idler wheels.

To sum up, by the aforesaid piezoelectric stators 40, lens 20 and seat 30, an piezoelectric-driving optical lens 10 can be established and adapted for various lens-related applications, such as video conference systems, monitor systems, conventional cameras, digital cameras and camera phones, as it is compact, solid, simple-in-structure, ease-to-manufacture, ease-to-assemble, and capable of exerting a comparatively larger torque. Comparing to prior art, the piezoelectric optical lens 10 is able to drive three piezoelectric stators 40 simultaneously for outputting maximum torque while maintaining the diameter as well as the thickness to be within 10 mm, that it is advantageous in small size. In addition, as the structures of the primary components of the invention, such as the piezoelectric stators 40, lens 20 and seat 30, are all very simple that can be integrally formed or can be assembled using common parts, it is ease-to-manufacture and ease-to-assemble.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A piezoelectric-driving optical lens, comprising:
   a lens, having a cylindrical barrel with a friction ring annularly mounted on the outer wall of the barrel as the outer diameter of the friction ring is larger than that of the cylinder;
   a plurality of piezoelectric stators, arranged surrounding the lens and abutted against the friction ring, for providing a rotation driving force to the lens;
   a seat, for receiving the lens and the plural piezoelectric stators;
   wherein each piezoelectric stator is configured of a metal tube and two piezoelectric ceramic pieces, each being arranged to adhere respectively on the metal tube, the metal tube is arranged to abut against the friction ring, and the two piezoelectric ceramic pieces being arranged adjacent to each other for forming a near-90 degree included angle therebetween.

2. The piezoelectric-driving optical lens of claim 1, wherein the lens further comprises:
   an inner screw thread, formed on the inner wall of the barrel;
   at least a frame, each for holding a set of optical lenses while each being screwed on the barrel;
   a lid, disposed at an axial end of the barrel for preventing the frame from moving out of the barrel; and
   a guide base, disposed at another axial end of the cylindrical barrel opposite to that of the lid, having a plurality of guide rods, each being arranged on a cylinder-facing surface of the guide base while extending inside the barrel;
   wherein, the axial direction of each guide rod is parallel to those of the barrel, each frame, the lid while enabling each guide rod to drill though and connect to each frame and the lid.

3. The piezoelectric-driving optical lens of claim 2, wherein the lens can have two or more than two frames while each frame can receive and hold one optical lens set.

4. The piezoelectric-driving optical lens of claim 2, wherein the guide base is mounted on a back cover while the back cover is connected to the seat.

5. The piezoelectric-driving optical lens of claim 2, wherein the guide base has one guide rod or more mounted thereon.

6. The piezoelectric-driving optical lens of claim 1, wherein the plural piezoelectric stators are equiangularly spaced and surrounding the periphery of the lens.

7. The piezoelectric-driving optical lens of claim 1, wherein the driving mode of each piezoelectric stator is a mode selected from the group consisting of a single-frequency single-phase driving mode, a single-frequency dual-phase driving mode, a dual-frequency single-phase driving mode and a dual-frequency dual-phase driving mode.

8. A piezoelectric-driving optical lens, comprising:
   a lens, having a cylindrical barrel with a friction ring annularly mounted on the outer wall of the barrel as the outer diameter of the friction ring is larger than that of the cylinder;
   a plurality of piezoelectric stators, arranged surrounding the lens and abutted against the friction ring, for providing a rotation driving force to the lens;
   a seat, for receiving the lens and the plural piezoelectric stators;
   at least a holding part, further comprising:
      a first hole, boring though the holding part for enabling the lens to pass therethrough;
      a gap, being substantially a cut from a side of the first hole to the periphery of the holding part; and
      a plurality of second holes, disposed surrounding the first hole for enabling the plural piezoelectric stators to pass therethrough in respective;
   a packing part, further comprising:
      a hole, boring though the packing part for enabling the lens and the plural piezoelectric stators to pass therethrough; and
      a gap, formed on the packing part at a position corresponding to the gap of the holding part;
   an adjusting part, for adjusting the clearance of the gap;
   wherein, two via holes are bored respectively from the two cutting surfaces of the gap to the periphery of the packing part while keeping the two via holes on a same axle and maintaining the axle shared by the two via holes to be perpendicular to the axle of the lens.

9. The piezoelectric-driving optical lens of claim 8, wherein the adjusting part further comprises:
   a resilience element, being disposed inside the gap of the packing part;
   a bolt, capable of being inserted into the two via holes of the packing part from one of the two openings of the two holes located at the periphery of the packing part while penetrating the resilience element; and
   a nut, being positioned at another opening of the two via holes located at the periphery of the packing part for the bolt to screw fixedly thereupon;
   wherein, the clearance of the gap of the packing part can be adjusted by relatively rotating the bolt and the nut.

10. The piezoelectric-driving optical lens of claim 9, wherein the resilience element is a substance selected from the group consisting of a spring, a reed, an elastic foam rubber, a sponge and the combinations thereof.

11. The piezoelectric-driving optical lens of claim 8, wherein the seat has two holding parts, being disposed respectively at positions corresponding to the front and back of the hole of the packing part.

12. The piezoelectric-driving optical lens of claim 1, wherein the seat is formed as a shape selected from the group consisting of a triangle, a square, a circle and other geometrical shape and the combinations thereof.

* * * * *